(12) United States Patent
Anderson et al.

(10) Patent No.: US 6,581,464 B1
(45) Date of Patent: Jun. 24, 2003

(54) TRACTION MOTOR SPEED SENSOR SUPPORT ARRANGEMENT

(75) Inventors: Larry G. Anderson, Erie, PA (US); James F. Cullen, Jacksonville, FL (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 09/648,061

(22) Filed: Aug. 25, 2000

Related U.S. Application Data

(60) Provisional application No. 60/150,997, filed on Aug. 27, 1999.

(51) Int. Cl.[7] .............................. G01P 1/02; G01D 21/00
(52) U.S. Cl. ........................................ 73/493; 73/866.5
(58) Field of Search ........................ 105/61, 49; 290/3, 290/45, 9; 318/68; 73/493, 489, 528

(56) References Cited

U.S. PATENT DOCUMENTS

| | | | |
|---|---|---|---|
| 3,786,512 A | * | 1/1974 | McCue et al. ............ 346/33 D |
| 3,911,302 A | * | 10/1975 | DeClaire .................... 324/174 |
| 3,930,189 A | | 12/1975 | Smith |
| 3,970,858 A | | 7/1976 | Rist et al. |
| 4,905,518 A | * | 3/1990 | Kubler ...................... 439/579 |
| 5,387,039 A | | 2/1995 | Bien |
| 5,392,716 A | | 2/1995 | Orschek et al. |
| 5,629,567 A | | 5/1997 | Kumar |
| 5,756,894 A | * | 5/1998 | Paolo et al. .................. 73/489 |

* cited by examiner

*Primary Examiner*—Helen Kwok
*Assistant Examiner*—Tamiko Bellamy
(74) *Attorney, Agent, or Firm*—Carl Rowold; Beusse Brownlee Bowdoin & Wolter, P.A.; David G. Maire

(57) ABSTRACT

A traction motor speed sensor support arrangement (30). A proximity sensor (34) is mounted within a housing (32) having a sensor support portion (44) cantilevered from a base portion (40). Dowel pins (60) extending from the base portion (40) position the sensor (34) at a predetermined locative relative to a rotating wheel (56) within the motor (10). A wire (50) leading from sensor (34) is formed in a rolling U (68) to accommodate movement of the motor (10) relative to the locomotive (52). The wire (50) is terminated at a connector (36) including a back shell portion (74) containing a stress-relieving loop (80) formed in wire (50). The natural frequency of the housing (32) is controlled to be greater than a predetermined value associated with the natural frequency of the motor operation.

15 Claims, 5 Drawing Sheets

TRACTION MOTOR SPEED SENSOR SUPPORT ARRANGEMENT

This application claims the benefit of the Aug. 27, 1999, filing date of U.S. provisional patent application serial No. 60/150,997.

BACKGROUND OF THE INVENTION

The present invention relates generally to the field of motor speed sensing, and more particularly, to an improved arrangement for mounting a speed sensor on a traction motor of a locomotive.

Locomotives typically employ a large diesel engine to drive an alternator, or they are powered by externally supplied electricity. The electric power from the alternator or the external supply is conducted to traction motors located beneath a platform of the locomotive. The traction motors convert the electrical power to rotational mechanical power. The traction motors are engaged to drive wheels through axles. The rotation of the wheels by the traction motors drives the locomotive along its rails.

The electrical power supplied to the traction motors is controlled to regulate the speed of the locomotive. Furthermore, the electrical power supplied to the motors may be regulated to avoid spinning of any one of the drive wheels. In order to properly control the operation of the traction motors, it is necessary to obtain a signal corresponding to the speed of rotation of each respective traction motor.

FIG. 1 illustrates a prior art apparatus utilized to obtain such a motor speed signal. Locomotive traction motor 10 is illustrated from a side view showing the motor frame head 12 which forms part of the motor frame. For locomotives provided by the assignee of the present invention, the motor frame is connected to a truck suspension supporting a truck frame, and the truck is connected to a platform suspension supporting the platform via the locomotive main sills. The frame head 12 is disposed in a generally vertical plane, and it contains a plurality of ventilation openings 14. As is well known in the art, the motor 10 contains a stationary stator portion and a rotating armature portion providing rotation of an output shaft about an axis of rotation 16. A prior art motor speed sensor 18 includes a housing 20 attached to a flange 22. Flange 22 may be formed to be integral with the frame head 12 or is attached thereto, and it extends into the interior of the motor 10 in cantilever form. The flange 22 is disposed on the motor frame head 12 proximate one of the ventilation openings 14. The speed sensor housing 20 is thereby attached to the motor frame head 12 at a distance $R_1$ from the axis of rotation 16. An electrical cable protected within a hose 24 extends from the housing 20 through the ventilation opening 14 and is routed along the exterior of the motor 10. A terminal end of the electrical cable is connected to the locomotive motor control system. One such prior art motor speed sensor 18 is supplied by the General Electric Company, assignee of the present invention, as part number GETS 41A296328BFP1.

The environment of a locomotive traction motor 10 is extremely harsh due to temperature extremes, vibration and shock loadings, dirt and chemical contamination, and magnetic fields. It is desirable to improve the speed sensor design in order to maximize the survivability of this important instrument within its intended environment.

BRIEF SUMMARY OF THE INVENTION

Accordingly, there is described herein an improved traction motor speed sensor support arrangement including: a locomotive traction motor having a frame head adapted for attachment to a locomotive and having an armature portion therein for rotation about an axis of rotation; a sensor housing comprising a base portion attached across the exterior of an opening in the frame head and a sensor portion cantilevered from the base portion and extending through the opening and toward the axis of rotation; and a proximity sensor supported by the sensor portion proximate the armature portion. The mechanical vibration input forces exerted on the speed sensor during the operation of the motor are lowered when compared to prior art devices by mounting the housing to a stiff portion of the motor frame head at a greater distance away from the axis of rotation of the motor.

In another aspect of the invention, the assembly may include a wire connected between the proximity sensor and a connector; the connector comprising a pin portion attached to the wire and a back shell portion attached to the pin portion; and a loop in the wire disposed within the back shell portion of the connector.

BRIEF DESCRIPTION OF THE DRAWINGS

The features and advantages of the present invention will become apparent from the following detailed description of the invention when read with the accompanying drawings in which.

Like structures illustrated in more than one figure are numbered consistently among the various figures.

DETAILED DESCRIPTION OF THE INVENTION

Figure 2:
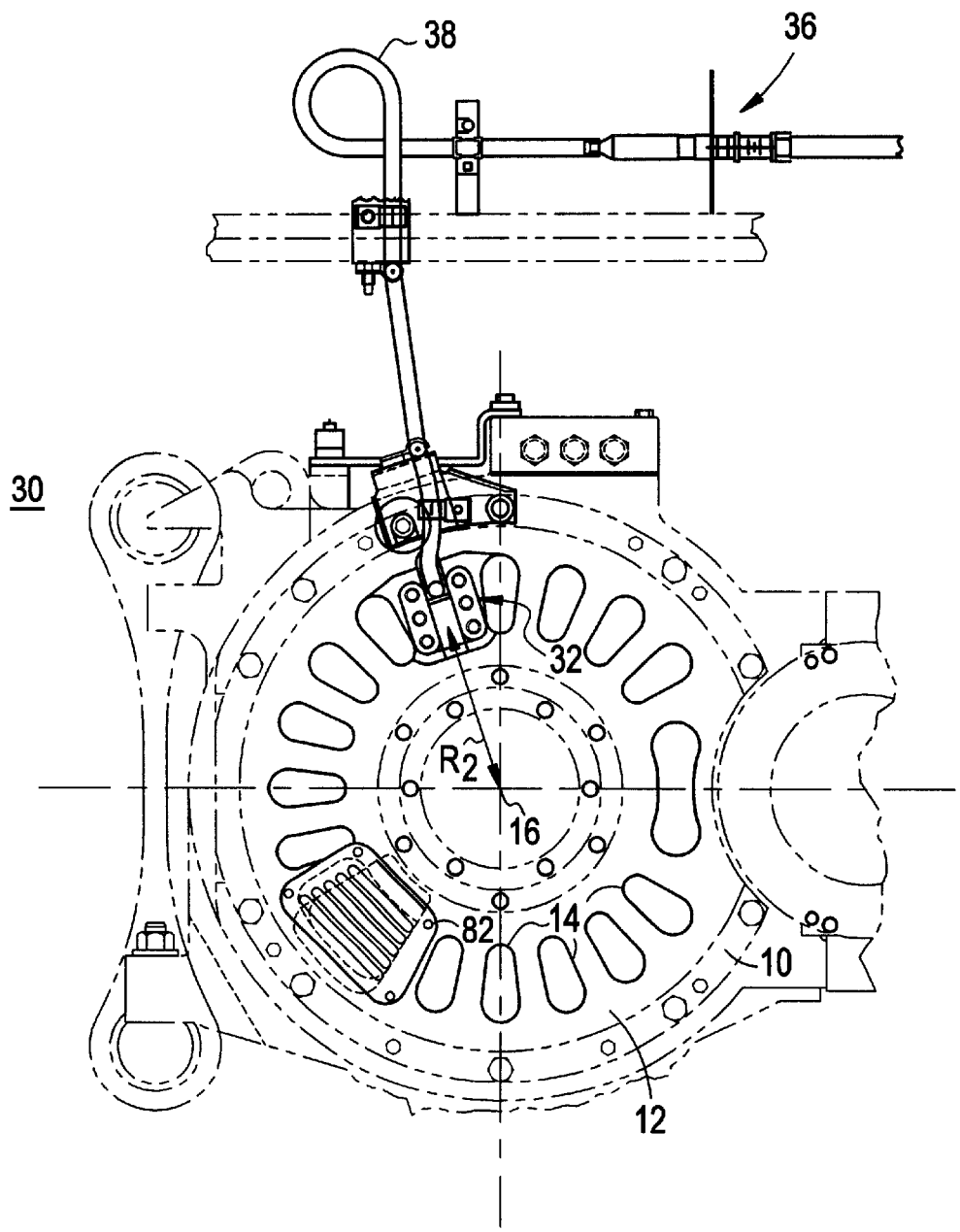
FIG. 2 illustrates an improved traction motor speed sensor arrangement.
Figure 4:
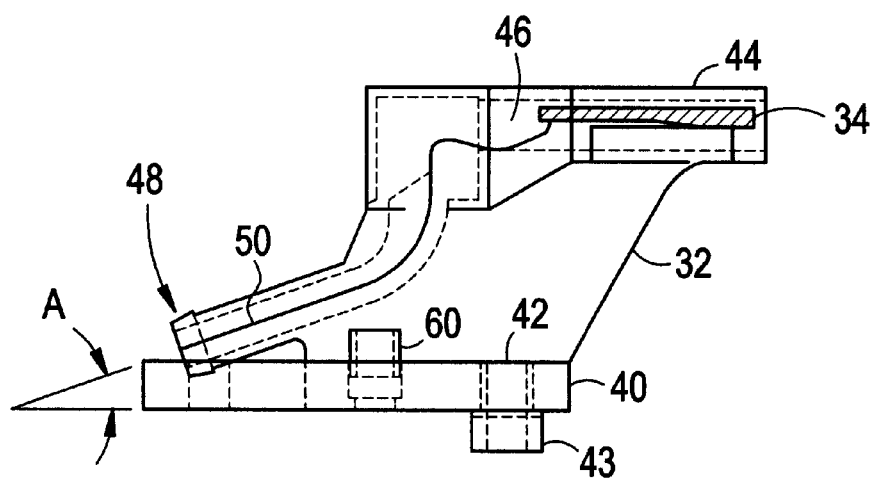
FIG. 4 is a sectional side view of the housing of FIG. 3.

FIG. 2 illustrates an improved locomotive traction motor speed sensor assembly 30. An improved sensor housing 32 is attached to the frame head 12 of the motor 10. A proximity sensor 34, as illustrated in FIG. 4, is supported by the housing 32. Hose 38 connects the housing 32 with a quick disconnect connector 36.

Figure 3:
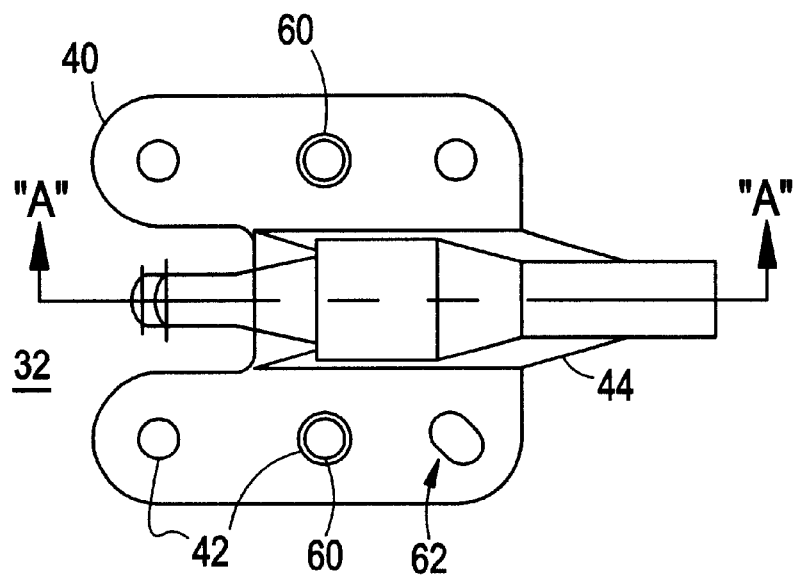
FIG. 3 is a top view of the housing of the traction motor speed sensor illustrated in FIG. 2.

FIGS. 3 and 4 illustrate the housing 32 in additional detail. The sensor housing 32 includes a base portion 40 sized to span across the exterior of one of the ventilation openings 14 in the frame head 12 of the traction motor 10. The base portion 40 may be attached to the frame head 12 by a plurality of bolts 43 passing through the plurality of holes 42 formed through the base portion 40. The housing 32 also includes a sensor support portion 44 attached to the base portion 40. The sensor support portion 44 includes a cavity 46 adapted to enclose and to support a proximity sensor head 34 as illustrated in FIG. 4. Because the sensor support portion 44 is formed as a cantilever from the base portion 40, the proximity sensor 34 will extend through the ventilation opening 14 and toward the axis of rotation 16 when the base portion 40 is attached to the motor frame head 12. The cavity 46 extends into a hose barb 48 formed integral to the housing 32. The hose barb 48 may be utilized to secure the hose 38 for the protection of a multi-conductor wire 50 which is connected to the proximity sensor head 34 for transmitting signals from the proximity sensor 34 through connector 36 to the locomotive traction control system.

The inventors have found that one point of vulnerability of prior art speed sensor designs is the attachment of the sensor head 34 to wire 50. Vibrations and shock loadings imposed on the speed sensor assembly can result in the fatigue failure of this joint. The inventors have found that the acceleration loads exerted on a speed sensor may be reduced by moving the point of attachment of the speed sensor away from the axis of rotation 16 of the traction motor 10. Because the frame head 12 is secured around its perimeter, and because the output shaft is attached to the frame head 12 through a bearing apparatus proximate the axis of rotation 16, the acceleration loadings imparted by the frame head 12 will decrease as the distance from the axis of rotation increases. Furthermore, the flange 22 of the prior art design illustrated in FIG. 1 will amplify such accelerations due to the cantilevered design of the flange 22. The inventors have designed housing 32 to attach directly to the motor frame head 12 to avoid this amplification effect. Furthermore, by supporting the sensor support portion 44 as a cantilever from the base portion 40, the location for attachment of the base portion 40 to the motor frame head 12 may be selected to be centered at a distance $R_2$ away from the axis of rotation 16, wherein distance $R_2$ is greater than the distance $R_1$ of the prior art design. In this manner, the input accelerations affecting the sensor housing 32 are further reduced when compared to the prior art design.

The inventors have also found that by maintaining the natural frequency of the housing 32 when it is attached to the frame head 12 to be at least 1200 hertz, it is possible to avoid resonance with the dominant driving frequencies generated by the traction motor 10 during its operation. To achieve such a high natural frequency, the inventors have found it necessary to utilize a plurality of holes 42 for locating a plurality of attachment bolts 43. For the housing design illustrated in FIGS. 3 and 4, a quantity of six such holes 42 are formed for receiving six bolts 43. For this design, the quantity of six is a number (N) sufficient to raise the natural frequency of the housing 32 to at least 1200 hertz with one of the bolts loose or missing and only five (N minus 1) of the bolts 43 tightened.

The hose barb 48 is preferably formed at an angle A of 20 degrees plus or minus 2 degrees from the plane of the base portion 40 in order to allow the attached hose 38 to extend through the ventilation opening 14 with minimal projection away from the motor frame head 12. The arrangement of the hose 38 may be seen more clearly in FIG. 5, which is a view of the motor 10 looking along the direction of the rail line. The position of motor 10 with respect to the locomotive main sill 52 and one of the drive wheels 54 may be appreciated from the perspective of FIG. 5. Motor 10 is illustrated in a partial sectional view to show the toothed wheel 56 which forms part of the rotating armature of motor 10. Wheel 56 provides rotational movement of teeth past the proximity sensor head 34 for generating the required speed signal. As can be seen from FIG. 5, the sensor support portion 44 extends downward and inward into the interior of the motor 10 away from the base portion 40 to position the sensor head 34 proximate the toothed wheel 56. The air gap 58 between the tip of the sensor 34 and the toothed wheel 56 must be controlled to be no more than about 0.015 inches to 0.050 inches. In order to control the air gap distance 58 to such a tight tolerance, the inventors have found it advantageous to install a dowel pin 60 in at least two of the holes 42 formed in the base portion 40. The dowel pins 60 may be pressed into their respective holes 42 with a portion extending above the base portion 40 for projecting into mating holes (not shown) formed in the exterior surface of the motor frame head 12. The holes for the dowel pins 60 and/or the mating holes in the motor frame head 12 may preferably be formed by a reaming process in order to maintain their position to a desired tight tolerance for positioning the housing 32 to a precise predetermined position relative to the axis of rotation 16. Dowel pins 60 are preferably hollow to permit the use of bolts 43 through the dowel pins 60 and into their respective threaded holes 42 in base portion 40.

As illustrated in FIG. 3, it may also be desirable to form one of the holes 42 to be a slot 62 where access to the base portion 40 is at least partially blocked by a nearby wheel 54. In this manner a respective bolt 43 may be started into slot 62 at an angle to avoid interference with wheel 54. Once the interference with wheel 54 has been cleared, the bolt 43 may then be straightened for threading into its respective motor frame hole 42.

Figure 5:
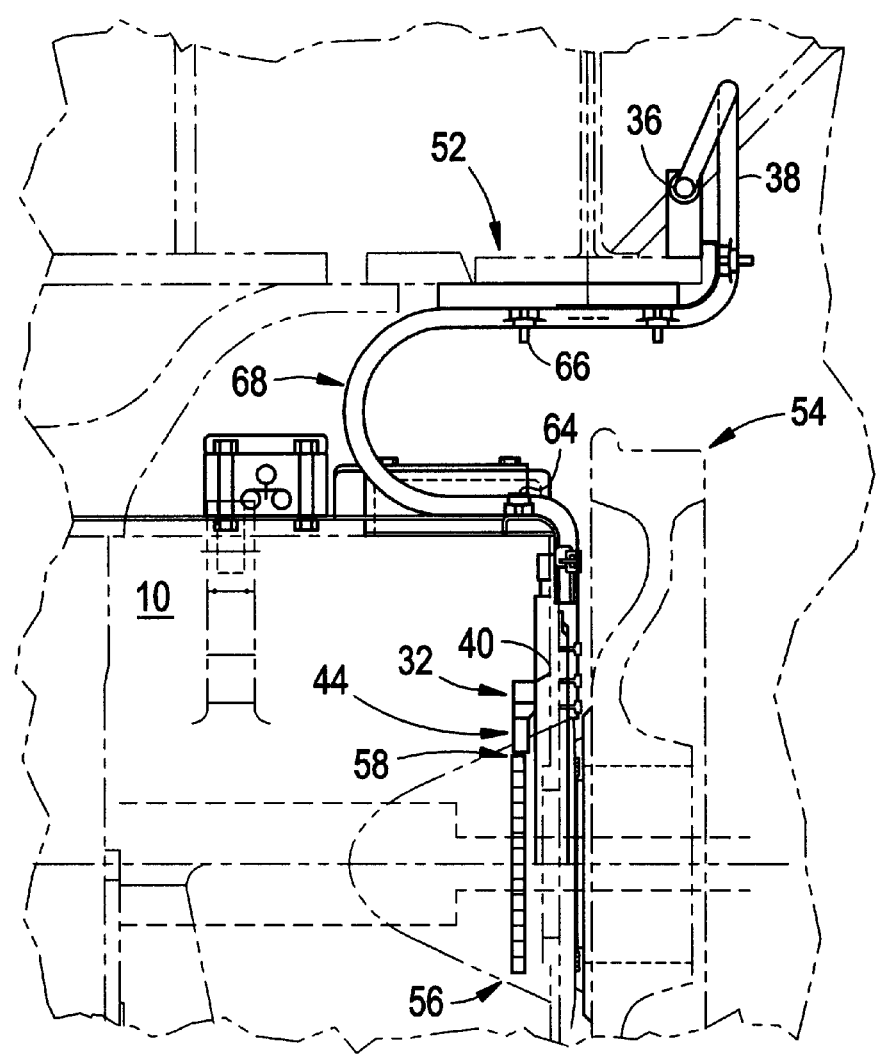
FIG. 5 is a side view of the traction motor speed sensor arrangement of FIG. 2.

FIG. 5 also illustrates the routing of hose 38 between the sensor housing 32 and connector 36. A first hose clip 64 is used to fasten the hose 38 to the motor 10. A second hose clip 66 is used to fasten the hose 38 to the locomotive main sill 52. By providing an excess of hose length between the two clips 64, 66, a rolling U 68 is formed in the hose 38 between the first hose clip 64 and the second hose clip 66 for accommodating relative movement between the motor 10 and the locomotive 52.

Figure 6:
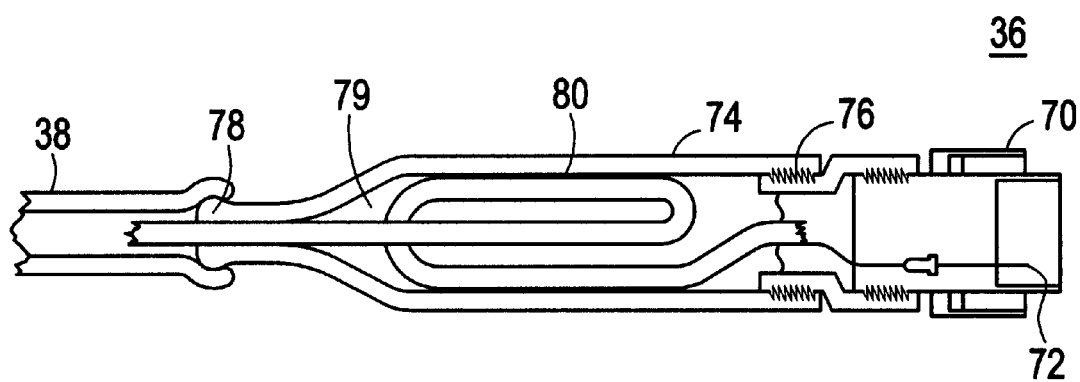
FIG. 6 is a sectional side view of the connector illustrated in FIG. 2.

FIG. 6 illustrates a partial sectional view of connector 36 used to connect multi-conductor wire 50 from the sensor head 34 to the locomotive traction control system. Connector 36 includes a pin portion 70 containing a plurality of pins 72 for mating with a respective female connector (not shown). Each conductor of wire 50 is attached to a respective pin 72 for electrical connection to the locomotive traction control system. A back shell portion 74 of connector 36 is formed to be attached to the pin portion 70, such as by threads 76. The back shell portion 74 may be shaped as a hose barb 78 at its end opposed the pin portion 70 for connection to hose 38. The inventors have found that by forming back shell portion 74 to have an interior cavity 79 with a length sufficient to enclose a loop 80 in wire 50, improved performance of connector 36 may be achieved. In the event of tension between the hose 38 and the connector 36, hose 38 will stretch. With prior art connector designs, such stretching of hose 38 would result in tension between the wire 50 and pins 72. By providing a loop 80 in the wire 50 within back shell portion 74, wire 50 is free to pull away from pins 72 by partially unwinding loop 80 without generating stress between wire 50 and pin 72.

Figure 1:
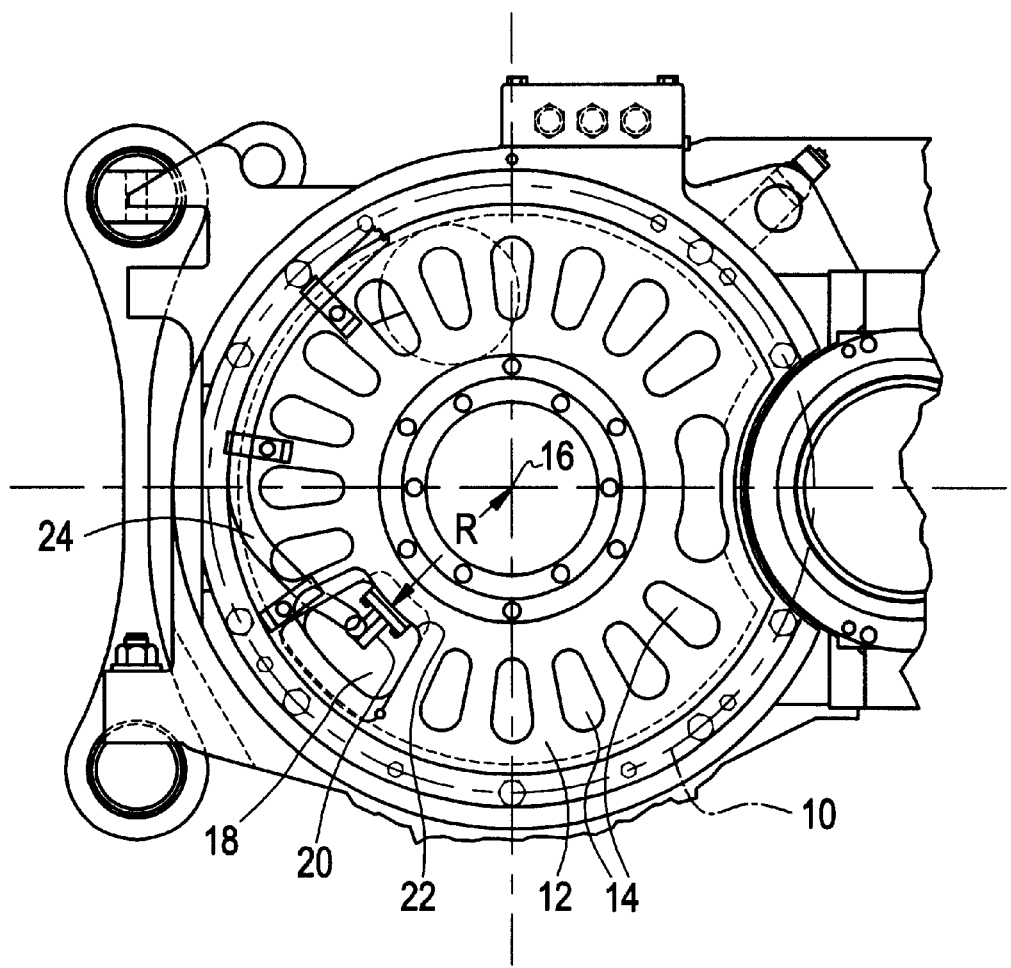
FIG. 1 illustrates a prior art traction motor speed sensor arrangement.

A locomotive having a prior art motor speed sensor assembly as illustrated in FIG. 1 may be modified to include a speed sensor assembly 30 as illustrated in FIG. 2. The prior art proximity sensor 18 is first removed from the motor 10. A dust cover 82 as illustrated in FIG. 2 may then be attached over the ventilation opening 14 where the prior art proximity sensor 18 had been removed. A housing 32 as illustrated in FIGS. 3 and 4 is then provided. A proximity sensor head 34 is then attached within housing 32, and may preferably be potted within cavity 46 to provide additional support to the sensor 34 and wire 50. The connecting wire 50 is routed through cavity 46 to extend away from the housing 32 through hose barb 48. Care must be taken during the assembly of the housing 32 and proximity sensor 34 in order to afford damage to the wire 50 or its connection to the sensor head 34. Cavity 46 should be formed to have a relatively smooth interior surface, and a protective tubing may be used to route wire 50 through cavity 46 to hose barb 48. The opposed end of wire 50 is then terminated to connector 36 as illustrated in FIG. 6. Appropriately spaced and sized threaded holes are formed in the motor frame head 12 on either side of an opening 14 for receiving bolts 43 for the attachment of housing 32 to the frame head 12. Dowel pins 60 are pressed into at least two of the holes 42 in the housing 32. The dowel pins 60 serve to align housing 32 to a predetermined position relative to the toothed wheel 56 as the sensor support portion 44 is inserted through the holes 14 and the base portion 32 is attached to the motor frame head 12. The distance $R_2$ between the base portion 40 and the axis of rotation 16 is preferably greater than the distance $R_1$ of the removed prior art sensor housing 20. A hose 38 is attached around wire 50 between the housing 32 and the connector 36, and is secured by hose clamps 64, 66 to form a rolling U 68 for accommodating movement of the motor 10. A loop of wire 80 is formed within the back shell portion 74 of connector 36 in order to accommodate any stretching of hose 38. The hose barb 48 is formed on housing 32 at an angle of 20 degrees plus or minus 2 degrees from a plane of the base portion 40 in order to avoid physical interference between hose 38 and locomotive wheel 54.

While the preferred embodiments of the present invention have been shown and described herein, it will be obvious that such embodiments are provided by way of example only. Numerous variations, changes and substitutions will occur to those of skill in the art without departing from the invention herein. Accordingly it is intended that the invention be limited only by the spirit and scope of the appended claims.

We claim:
1. An assembly comprising:
   a locomotive traction motor having a frame head adapted for attachment to a locomotive and having an armature portion therein for rotation about an axis of rotation;
   a sensor housing comprising a base portion attached across the exterior of an opening in the frame head and a sensor portion cantilevered from the base portion and extending through the opening and toward the axis of rotation; and
   a proximity sensor supported by the sensor portion proximate the armature portion.
2. The assembly of claim 1, further comprising:
   a wire connected between the proximity sensor and a connector;
   the connector comprising a pin portion attached to the wire and a back shell portion attached to the pin portion; and
   a loop in the wire disposed within the back shell portion of the connector.
3. The assembly of claim 2, further comprising:
   a hose barb formed on each of the sensor housing and the back shell portion of the connector; and
   a hose connected between the sensor housing hose barb and the back shell portion hose barb and containing the wire therein.
4. The assembly of claim 3, wherein the hose barb is disposed at an angle of 20 degrees plus or minus 2 degrees from a plane of the base.
5. The assembly of claim 3, further comprising:
   a first hose clip fastening the hose to the motor;
   a second hose clip fastening the hose to the locomotive; and
   a rolling U formed in the hose between the first hose clip and the second hose clip for accommodating relative movement between the motor frame head and the locomotive.

6. The assembly of claim 1, further comprising:
   a plurality of holes formed in the base portion and adapted for receiving bolts for securing the base portion to the motor frame head; and
   a dowel pin press fit into each of at least two of the plurality of holes for positioning the sensor portion to a predetermined position relative to the axis of rotation;
   wherein the plurality of holes comprises a quantity of holes N for receiving N bolts, and wherein N is a number sufficient to raise the natural frequency of the housing to at least 1200 hertz with N minus one bolts tightened and one bolt missing.
7. The assembly of claim 6, wherein one of the plurality of holes comprises a slot.
8. A housing for a locomotive traction motor speed sensor, the housing comprising:
   a base having a surface sufficiently wide for spanning across the exterior of an opening in a frame head of a locomotive traction motor, the base attachable to the frame head at a first distance from an axis of rotation of the motor; and
   a sensor support portion adapted for receiving a proximity sensor, the sensor support portion attached to the base as a cantilever for supporting the proximity sensor through the opening and toward the axis of rotation to position the proximity sensor at a second distance from the axis of rotation less than the first distance.
9. The housing of claim 8, further comprising:
   a plurality of holes formed in the base and adapted for receiving bolts for securing the base to the frame head; and
   a dowel pin press fit into each of at least two of the plurality of holes for positioning the sensor support portion to a predetermined position relative to the axis of rotation;
   wherein the plurality of holes comprises a quantity of holes N for receiving N bolts, and wherein N is a number sufficient to raise the natural frequency of the housing to at least 1200 hertz with N minus one bolts tightened and one bolt missing.
10. The housing of claim 8, wherein the sensor support portion further comprises a hose barb disposed at an angle of 20 degrees plus or minus 2 degrees from a plane of the base.
11. The assembly of claim 9, wherein one of the plurality of holes comprises a slot.
12. A locomotive traction motor sensor support arrangement comprising:
   a base portion adapted for attachment to a frame head of a locomotive traction motor proximate an opening in the frame head, the base portion attachable to the frame head at a first distance from an axis of rotation of the motor;
   a sensor support portion attached to the base portion as a cantilever extending through the opening and toward the axis of rotation relative to the base portion; and
   a sensor supported by the sensor support portion at a position within the motor a second distance from the axis of rotation less than the first distance.
13. The arrangement of claim 12, further comprising the base portion being attached across the opening.
14. The arrangement of claim 12, wherein the sensor comprises a proximity sensor.

15. The arrangement of claim 12, further comprising:
a wire connected between the sensor and a connector;
the connector comprising a pin attached to the wire and a back shell portion attached to the pin portion; and
a loop in the wire disposed within the back shell portion of the connector.

* * * * *